(12) United States Patent
Vandekerkhove

(10) Patent No.: US 8,554,430 B2
(45) Date of Patent: Oct. 8, 2013

(54) METHOD FOR ANTICIPATING DOWNSHIFTING AND FOR MONITORING AN AUTOMATIC TRANSMISSION

(75) Inventor: Remi Vandekerkhove, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 13/144,157

(22) PCT Filed: Dec. 10, 2009

(86) PCT No.: PCT/FR2009/052471
§ 371 (c)(1),
(2), (4) Date: Oct. 6, 2011

(87) PCT Pub. No.: WO2010/079275
PCT Pub. Date: Jul. 15, 2010

(65) Prior Publication Data
US 2012/0022753 A1    Jan. 26, 2012

(30) Foreign Application Priority Data

Jan. 12, 2009  (FR) ...................................... 09 50133

(51) Int. Cl.
*G06F 17/00* (2006.01)
*B60W 10/04* (2006.01)
*B60K 20/00* (2006.01)

(52) U.S. Cl.
USPC .............................. 701/55; 477/111; 74/473.1

(58) Field of Classification Search
USPC .................... 123/41.05, 339.22, 339.24, 381, 123/406.55, 406.7, 435, 678, 686, 689, 558, 123/421, 425, 288, 258, 292, 321, 90.23, 123/90.4, 146, 336, 348, 47 AB, 65 V; 701/54, 701/55, 56, 61, 66, 67, 85, 86, 93, 95, 101, 701/102, 103, 104, 105, 29.1, 29.5; 474/111, 474/169, 473.1, 567, 117, 821; 73/593, 660, 73/820, 114.63, 114.41–114.57, 204.19; 477/15, 111, 50, 69, 76, 98, 117, 37, 97, 477/91; 74/473.1, 567, 117, 821
See application file for complete search history.

(56) References Cited

U.S. PATENT DOCUMENTS 5,672,139 A    9/1997  Horiguchi
6,123,644 A    9/2000  Janecke et al.
(Continued)

FOREIGN PATENT DOCUMENTS

DE   10 2004 002 813    8/2005
WO        2006 074760    7/2006

OTHER PUBLICATIONS

International Search Report issued Mar. 4, 2010 in PCT/FRO9/52471 filed Dec. 10, 2009.
(Continued)

*Primary Examiner* — Muhammad Shafi
(74) *Attorney, Agent, or Firm* — Oblon, Spivak, McClelland, Maier & Neustadt, L.L.P.

(57) ABSTRACT

A method for anticipating downshifting upon uphill driving on a vehicle including an automatic transmission and including change laws imposing a change to a lower gear based on pre-established downshifting curves. The method imposes a change to the lower gear to the transmission independently from the gear set point established by the change laws when the acceleration that can be reached at the maximum torque on the current gear is lower than an acceleration threshold necessary for maintaining the vehicle speed.

10 Claims, 4 Drawing Sheets

(56) References Cited

U.S. PATENT DOCUMENTS

| | | | |
|---|---|---|---|
| 2002/0103594 A1* | 8/2002 | Grone et al. | 701/110 |
| 2004/0002803 A1* | 1/2004 | Lee et al. | 701/59 |
| 2008/0085815 A1 | 4/2008 | Winkel et al. | |
| 2009/0265067 A1* | 10/2009 | Wolfgang et al. | 701/58 |

OTHER PUBLICATIONS

French Search Report issued Aug. 11, 2009 in FR 0950133 filed Jan. 12, 2009.

* cited by examiner

METHOD FOR ANTICIPATING DOWNSHIFTING AND FOR MONITORING AN AUTOMATIC TRANSMISSION

BACKGROUND

The present invention relates to the monitoring of an automatic transmission, and in particular the monitoring of downshifts when driving uphill, on a vehicle equipped with an automatic transmission having change laws which already impose on it changes to the lower gear, based on preestablished downshift curves.

When a vehicle equipped with an automatic transmission is traveling uphill, the transmission adapts its operation, in order to provide the driver with more reserve torque. Conventionally, the transmission estimates the slope percentage, and applies a gear change law suited to the slope: when driving uphill, the gear changes are thus performed at higher speed.

However, fine tuning change laws suited to the various road profiles is a complex operation.

For this reason, the publication FR 2 842 579 proposes another method for adapting the operation of an automatic transmission when driving uphill. This method is based on the estimation of the acceleration that the vehicle can potentially reach after an upshift. Such an estimation makes it possible to decide on the opportunity as to whether or not to perform this upshift, if it is requested by the change law applied in the transmission.

According to this publication, the acceleration that can be reached after the gear change is calculated according to the current acceleration, the current engine torque, and the torque difference provided before/after the change. The upshift is then authorized only if the acceleration that can potentially be reached after the gear change is greater than a threshold, called comfort threshold.

The two main drawbacks to this method are on the one hand the weaknesses in the estimation of the acceleration that can be reached after an upshift, and on the other hand the fact that only the upshift gear changes are adapted to the slope. In practice, the downshifts are based either on the change law, or on a loss of speed by lifting the foot criterion, which is difficult to apply.

BRIEF SUMMARY

The present invention aims to improve the estimation of the acceleration in a method for anticipating changes.

It proposes in particular a method for automatically adapting the downshifts to the slope, which obviates the need to perfect laws suited to uphill driving.

To this end, it provides for the change to the lower gear to be imposed on the transmission independently of the gear set point established by the change laws, when the acceleration that can be reached at the maximum torque on the current gear is less than the acceleration threshold needed to maintain the speed of the vehicle.

Preferably, the acceleration that can be reached is estimated by calculating the difference between the torque on the wheel corresponding to the maximum engine torque that can be reached on the current gear upon a boost request by depressing the pedal on the one hand, and the torque applied to the wheel corresponding to the current engine torque on the other hand.

The invention also proposes a method for monitoring the gear changes on an automatic transmission having change laws imposing a gear set point according to preestablished change laws, in which the downshifts are triggered both by application of the change laws of the transmission, and by anticipation.

BRIEF DESCRIPTION OF THE DRAWINGS

The present invention will be better understood on reading the following description of a nonlimiting embodiment thereof, with reference to the appended drawings in which.

DETAILED DESCRIPTION

Figure 1:
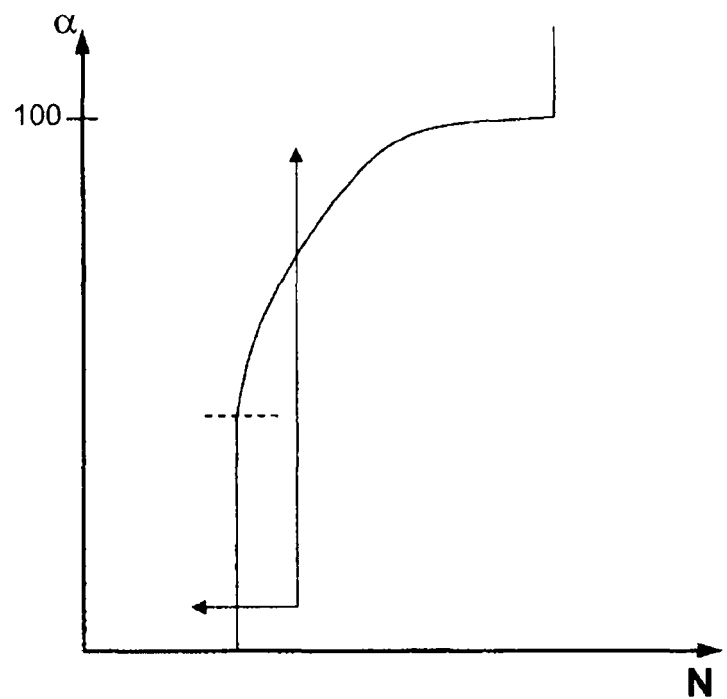
FIG. 1 shows an exemplary downshift curve of a change law.

The downshift curve in a plane N, $\alpha$ (N being the engine speed in revolutions per minute and $\alpha$ being the pedal depression angle as a percentage), reproduced by way of example in FIG. 1, can be broken down into two parts. A vertical bottom part called "law foot", and a top curve part called "law core". The crossing of this curve results in a downshift. It may be performed in two ways. Following a deceleration, when the driver's foot is raised, the curve is crossed in its bottom part. When the acceleration pedal is depressed, that is to say on a boost request on the part of the driver, the curve is crossed in its top part.

The "law core" is generally positioned beyond the reach of the maximum torque. In practice, upon an acceleration request from the driver by pressing on his pedal, the engine reaches its maximum torque before a possible downshift, to increase the available power.

Thus, when the vehicle is decelerating with the foot raised, and the speed approaches the downshift speed, if the driver accelerates, he normally reaches the maximum engine torque available at this speed, before intersecting the law core. If he continues to depress the pedal, he triggers a downshift.

However, if the driver simply depresses the pedal to the level at which the maximum torque is reached, it is essential to guarantee that this torque will be sufficient for him to at least maintain the speed of the vehicle.

The downshift "law foot" is therefore positioned in theory at sufficiently high speed to guarantee that the acceleration at the maximum engine torque that could be reached at this speed is sufficient to have a positive acceleration on the slope being climbed by the vehicle.

In the method known from the publication FR 2 842 579, only the upshift gear changes are adapted to the slope, whereas the downshifts are based either on the change law, or on a loss of speed by lifting the foot criterion. However, this criterion is no easier to perfect than a change law, and does not constitute a reliable adaptation to the slope.

The proposed method for anticipating downshifts makes it possible to automate the observance of this criterion by calculation of the acceleration that can be reached at the maximum torque at the current speed on the slope encountered.

According to this method, the change to the lower gear (R−1) is imposed on the transmission independently of the gear set point established by the change laws, when the acceleration that can be reached at the maximum torque $a_{est}(C_{m\_max})$ on the current gear (R) is less than the acceleration threshold needed to maintain the speed of the vehicle.

This entails calculating the acceleration that can be reached with the current maximum torque, speed and slope (acceleration that can be reached on boost request) and having an algorithm to force a downshift, when this acceleration is too low.

The proposed method for anticipating downshifts can therefore be incorporated in a global method for monitoring an automatic transmission, in which the downshifts are triggered either by application of the change laws of the transmission, or by anticipation.

The calculation of the acceleration that can be reached on boost request, at the engine speed and with the current slope can be estimated from the calculation of the difference between the torque on the wheel corresponding to the maximum engine torque $C_r(C_{m\_max})$ that can be reached on the current gear upon a boost request by depression of the pedal, and the torque applied to the wheel corresponding to the current engine torque $C_r(C_m)$.

In this case, the calculation can be done using a relationship of the type:

$$a_{est}(C_{m\_max}) = a_{mes} + \frac{1}{M}\frac{C_r(C_{m\_max}) - C_r(C_m)}{r},$$

in which:

$a_{est}(C_{m\_max})$ is the acceleration that can be reached at the maximum engine torque, $a_{mes}$ is the measured acceleration, obtained by derivation of the vehicle speed, which is in turn supplied to the gearbox control computer, for example by the ABS computer, via the multiplexed network, M is the weight of the vehicle, estimated, for example, by a weight estimation method, as described in the publication FR 2 737 761.

$C_r(C_{m\_max})$ is the torque on the wheel corresponding to the maximum engine torque, $C_r(C_m)$ is the torque on the wheel corresponding to the current engine torque, and r is the radius of the tires, a constant which can be calibrated.

The torque on the wheel corresponding to the current engine torque can be obtained by a relationship of the type:

$C_r(C_m) = C_m \times K(R)$, in which:

$C_m$ is the engine torque, estimated by the engine control computer, and transmitted to the gearbox control computer via the multiplexed network, and K(R) is the gear ratio of the transmission on the gear R, given by a mapping contained in the automatic transmission control computer.

The maximum torque on the wheel $C_r(C_{m\_max})$ however is not identical to the maximum engine torque $C_{m\_max}(N_m)$. They are linked by a correction factor, according to the relationship:

$C_r(C_{m\_max}) = F_{corr} \times C_{m\_max}(N_m) \times K(R)$, in which $N_m$ is the engine speed, $C_{m\_max}(N_m)$ is the theoretical maximum engine torque calculated on the basis of the engine speed by means of a mapping contained in the automatic transmission control computer, and K(R) is a coefficient needed for the correction, and K(R) is the gear ratio.

The correction factor $F_{corr}$ is a correction factor to be applied to the theoretical maximum engine torque, equal to the actual engine torque divided by the theoretical engine torque. This theoretical engine torque is estimated by the transmission control computer, by means of a mapping based on the engine speed, and the pedal angle.

$F_{corr}$ can be estimated on the basis of the engine torque $C_m$, estimated by the engine control computer and transmitted to the gearbox control computer via the multiplexed network, and the torque set point applied by the engine $C_{m\_set\ point}$.

The torque set point $C_{m\_set\ point}$ is derived from an algorithm internal to the engine control computer taking into account the pedal angle and the engine speed and can be transmitted to the gearbox control computer via the vehicle's multiplexed network.

However, on the engine computer side, the algorithm for calculating the set point torque is more complex than a simple mapping. Furthermore, the fine tuning of the torque mapping in the transmission control computer may differ from the fine tuning of the algorithm in the engine control computer, in particular when the engine is in the tuning phase. Consequently, the theoretical engine torque calculated by the transmission is often significantly different from the set point torque actually applied by the engine.

In the absence of any particular provisions, the corrective factor $F_{corr}$ (whose role is to register all the performance loss factors which cause the actual engine torque to be less than the theoretical torque: altitude, particulate filter clogged, etc.), would therefore be falsified.

Figure 2:
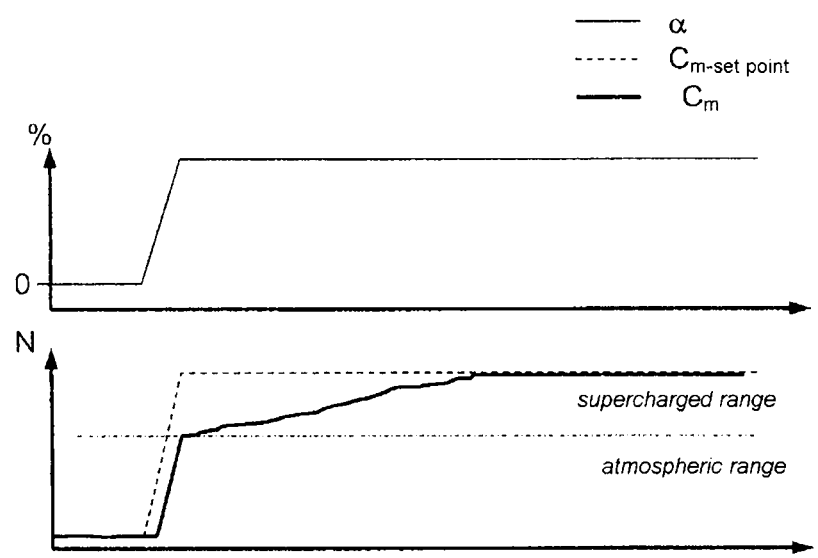
FIG. 2 is a schematic illustration of the response time of a supercharged engine.

In the particular case of a supercharged engine, the predominant torque loss factor at low speed is the long response time of the supercharging. The effect is as follows. FIG. 2 shows that, upon a full depression of the accelerator pedal (depression angle α) by the driver, the torque of the engine $C_m$ initially increases very rapidly while it is within the atmospheric range PA, then much more slowly when it reaches the supercharged range PS.

To overcome the delay time of the turbocharger in response to the boost request from the driver, the invention proposes retaining a time average of the values of the ratio $$\frac{C_m}{C_{m\_set\ point}}.$$

The correction factor $F_{corr}$ is then:

$$F_{corr} = \text{time\_average}\left[\frac{C_m}{C_{m\_set\ point}}\right]$$

This time average is preferably obtained by a conventional first-order filtering, with an adjustable long time constant.

If y(T) is the output of the low-pass filter expressed at the instant Tt, y(T−1) is the output of the low-pass filter expressed at the instant T−1, that is to say in the preceding calculation step, and x(T) is the input of the low-pass filter expressed at the instant T, these variables are linked by a relationship of the time: y(T)=K*x(T)+(1−K)*y(T−1), in which K represents the gain of the filter.

This gain is linked to the calculation period of the time filter separating the instants T and T−1 "SampleTime", and to the time constant of the low-pass filter Tau by the relationship K=1−exp(−SampleTime/Tau).

However, the calculation of the time average $$\frac{C_m}{C_{m\_set\ point}}$$

is activated only if the set point torque applied by the engine is greater than a fixed threshold, representative of the limit of the atmospheric range of the engine.

Figure 3:
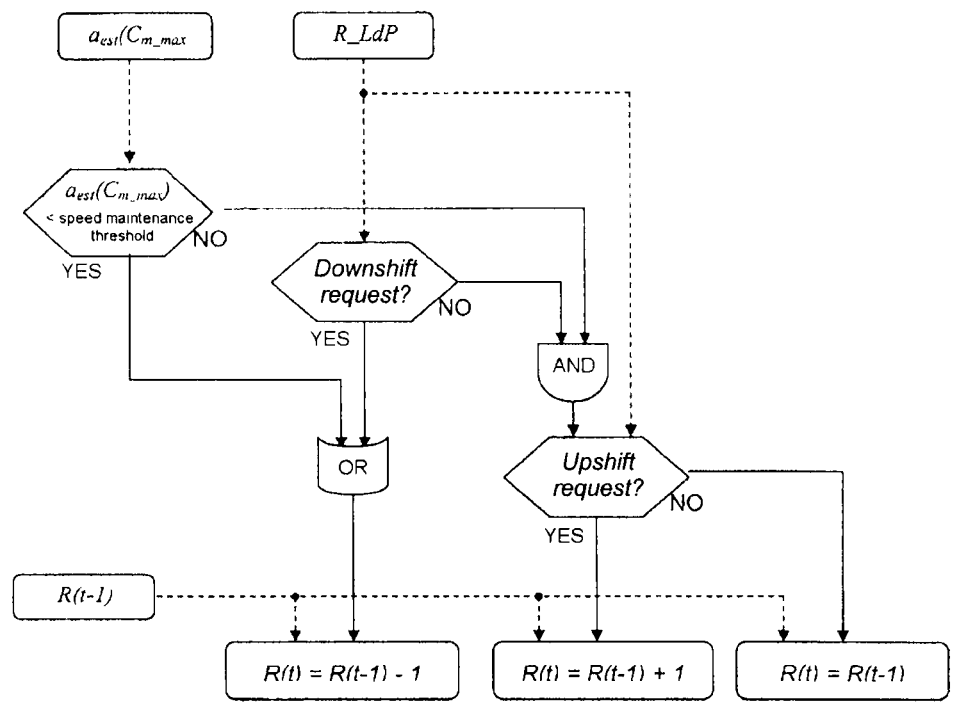
FIG. 3 is the algorithm for monitoring the gear changes of the automatic transmission.

The proposed anticipation of the downshifts can thus be implemented according to the principle of FIG. 3. First of all, the acceleration that can be reached at the maximum torque is compared to the acceleration threshold needed to maintain the speed (approximately 0 m/s², calibratable constant). If the acceleration is less than this threshold, a downshift is requested. Physically, the set point gear of the transmission at the instant t will be equal to the set point gear at the preceding instant minus 1.

In parallel, the set point gear at the output of the change laws is evaluated. If the set point at the law output is a downshift request, this downshift is performed.

If no downshift is requested, either by the laws, or by the evaluation of the acceleration that can be reached at the maximum torque, the set point gear at the output of the change laws is evaluated again, in order to see if an upshift is requested, in which case the change request is transmitted by incrementation of the final set point gear.

Finally, if no upshift is requested, the final set point gear remains unchanged.

It is also possible to monitor, according to the slope, not only the downshifts, but also the upshifts. As previously, the slope (which is taken into account in calculating the weight M), is then used in calculating the acceleration estimated on the higher gear $a_{est}(R+1)$. The invention provides for calculating the acceleration on the immediately higher gear, in a manner similar to the acceleration that can be reached on the lower gear, by a relationship such that:

$$a_{est}(R+1) = a_{mes} + \frac{1}{M}\frac{C_r(R+1) - C_r(R)}{r},$$

in which
$a_{mes}$ is the measured acceleration, obtained by derivation of the vehicle speed which is itself supplied, for example, by the ABS computer, M is the weight of the vehicle, Cr(R+1): the torque on the wheel on the higher gear, Cr(R) is the torque on the wheel on the current gear, and r is the radius of the tires.

As previously, the torque on the wheel on the current gear is obtained by a relationship of the type $C_r(R) = C_m \times K(R)$, in which $C_m$ is the engine torque, estimated by the engine control computer, and K(R) is the gear ratio of the transmission on the gear R, given by a mapping contained in the automatic transmission control computer.

The torque on the wheel on the higher gear can then be estimated by the relationship:

$$C_r(R+1) = \left[\frac{C_m}{C_{m\_calculated}[N_m, AP]}\right] \times$$

$$C_{m\_calculated}[N_m(R+1), AP] \times K(R+1)$$

In this expression, $C_{m\_calculated}$ is the theoretical engine torque calculated on the basis of the engine speed and the angle of the acceleration pedal by means of a mapping, $N_m$ is the engine speed, AP is the angle of the accelerator pedal. Finally, $N_m(R+1)$, which is the speed that the engine will reach after the change to the higher gear, can be estimated by the relationship $$N_m(R+1) = \frac{K(R+1)}{K(R)} \times N_m.$$

These calculations are used to implement the following strategy. When the acceleration that can be reached on the higher gear is less than a first calibratable threshold, and the slope is greater than a second calibratable threshold, then the upshifts are prohibited. They become allowed again if the acceleration that can be reached on the higher gear becomes greater than a threshold greater than the first acceleration threshold, where if the slope becomes less than a threshold less than the first slope threshold.

The algorithm of FIG. 3 is thus applicable as a complete strategy for controlling the gear changes of an automatic transmission having change laws imposing a gear set point (R) according to preestablished change laws. According to this method, the downshifts are triggered on the one hand by application of transmission change laws, and on the other hand by anticipation.

Thus, by virtue of the invention, the downshifts, and the upshifts to the immediately higher gear, can be triggered by anticipation in accordance with the proposed provisions.

The invention offers numerous advantages. Among these, it should be noted that the acceleration taken into account to trigger or not trigger the anticipated change is always determined by calculating a torque difference between the current engine torque and the torque that can be reached. However, the torque that can be reached is no longer that which would be reached after the anticipated change, but the torque which will be reached on the current gear, following the boost request.

Moreover, the acceleration that can be reached takes into account the slope of the road, both for the anticipation of the upshifts, and for the anticipation of the downshifts. Thus, the anticipation method proposed by the invention makes it possible to automatically adapt the anticipation of the downshifts and of the upshifts to the slope of the road.

Replacing the calculated engine torque $C_{m\_calculated}$ with the computer set point torque $C_{m\_set\ point}$ in calculating the correction factor $F_{corr}$ is also of great interest. This is because it is then possible to be certain that the corrective factor is based on the exact value of the set point applied by the engine control computer.

Finally, it is important to note the particular arrangement introduced by the invention in calculating the correction factor $F_{corr}$, which is now derived from the time average of the instantaneous torque loss ratio. This is because the calculation of this average may be activated only when the set point torque applied by the engine is greater than the limit of its atmospheric range, in order to obtain the final corrective factor. The aim of this improvement is to obtain a more accurate estimation of the actual torque/theoretical torque ratio which will be observed at the time of the boost request.

As indicated above, the instantaneous actual torque/theoretical torque ratio observed when the pedal is released is not representative of the ratio which will be observed when the driver has depressed the pedal to boost the vehicle. This can lead to a wide overestimation of the acceleration that can be reached at the time of the boost request.

A better way of estimating the torque loss ratio after the boost request is therefore to calculate a time average of the ratio observed on the preceding boost requests. First-order filtering is the most effective way of calculating this time average.

Finally, the calculation of the average is activated only if the set point torque applied by the engine is greater than a fixed threshold, representative of the limit of the atmospheric range. The average corrective factor is thus calculated only when the driver makes a boost request, and takes into account only the situations in which the turbo response time is involved.

Figure 4:
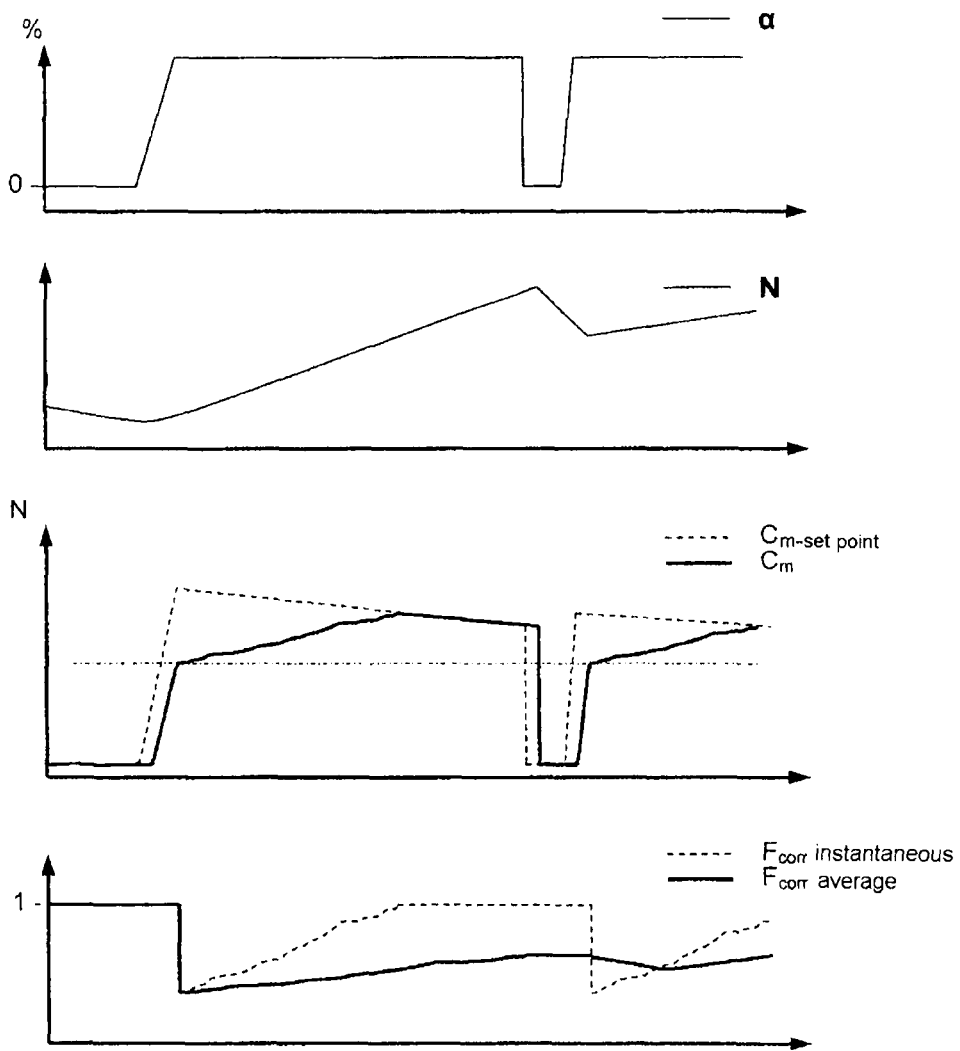
FIG. 4 is a schematic illustration of the torque response of a supercharged engine upon a boost request when driving uphill.

FIG. 4 illustrates this third improvement: it can be seen that the average correction factor, derived from the preceding boost requests, is a better estimation of the torque loss ratio which is observed at the time of the boost request than the instantaneous correction factor on lifting the foot. Finally, the overestimation of the acceleration that can be reached at the time of the boost request is reduced.

The invention claimed is:

1. A method for performing downshifts when driving uphill on a vehicle including an automatic transmission that includes change laws to impose changes to a lower gear based on preestablished downshift curves of the change laws, the method comprising:

comparing by an automatic transmission control computer an acceleration $a_{est}$ ($C_{m\text{-}max}$) that can be reached at a maximum torque on a current gear to an acceleration threshold needed to maintain a current speed of the vehicle; and changing a gear ratio of the transmission to the lower gear by the automatic transmission control computer independently of a gear set point established by the change laws, when the acceleration $a_{est}$ ($C_{m\text{-}max}$) that can be reached at the maximum torque on the current gear is less than the acceleration threshold needed to maintain the current speed of the vehicle, wherein the acceleration $a_{est}(C_{m\_max})$ that can be reached at the maximum torque is estimated by a relationship of:

$$a_{est}(C_{m\_max}) = a_{mes} + \frac{1}{M} \frac{C_r(C_{m\_max}) - C_r(C_m)}{r},$$

in which $a_{mes}$ is measured acceleration of the vehicle, M is weight of the vehicle, $C_r(C_{m\_max})$ is torque on the wheel corresponding to maximum engine torque, $C_r(C_m)$ is torque applied to a wheel corresponding to current engine torque, and r is radius of tires of the vehicle.

2. The method as claimed in claim 1, wherein the acceleration that can be reached $a_{est}(C_{m\_max})$ is estimated by calculating a difference between torque on a wheel corresponding to maximum engine torque $C_r(C_{m\_max})$ that can be reached on the current gear upon a boost request by depression of an accelerator pedal of the vehicle, and torque applied to a wheel corresponding to current engine torque $C_r(C_m)$.

3. The method as claimed in claim 2, wherein the torque on the wheel corresponding to the maximum engine torque $C_r(C_{m\_max})$ is linked to a theoretical maximum torque of the engine at the current speed by a correction factor ($F_{corr}$).

4. The method as claimed in claim 3, wherein the correction factor ($F_{corr}$) is a function of a ratio between an estimation of an engine torque by an engine control computer, and a torque set point applied by the engine control computer.

5. The method as claimed in claim 4, wherein the correction factor ($F_{corr}$) is a time average of values of the ratio that are calculated on preceding vehicle boost requests by depression of the accelerator pedal by the driver.

6. The method as claimed in claim 5, wherein the calculation of the time average is activated only if the set point torque applied by the engine is greater than a fixed threshold representative of a limit of atmospheric range of the engine.

7. A method for monitoring gear changes on an automatic transmission including change laws, comprising:

imposing a gear set point according to preestablished change laws, wherein downshifts are triggered by application of the transmission change laws, and by the performing method in accordance with claim 1.

8. The monitoring method as claimed in claim 7, wherein upshifts to an immediately higher gear are prohibited when the acceleration that can be reached on the higher gear is less than a first acceleration threshold, and the slope is also greater than a first slope threshold.

9. The monitoring method as claimed in claim 8, wherein the upshifts to the immediately higher gear are again allowed when the acceleration that can be reached on the higher gear becomes greater than a second acceleration threshold greater than the first threshold, or if the slope becomes less than a second slope threshold less than the first slope threshold.

10. The monitoring method as claimed in claim 8, wherein the upshifts to the immediately higher gear are triggered by the performing method.

* * * * *